F. GIRARDI.
ROTARY ENGINE.
APPLICATION FILED JAN. 31, 1919.

1,333,615.

Patented Mar. 16, 1920.
2 SHEETS—SHEET 1.

Witnesses
Arthur F. Draper
Karl H. Butler

Inventor
Frank Girardi
By
Attorneys

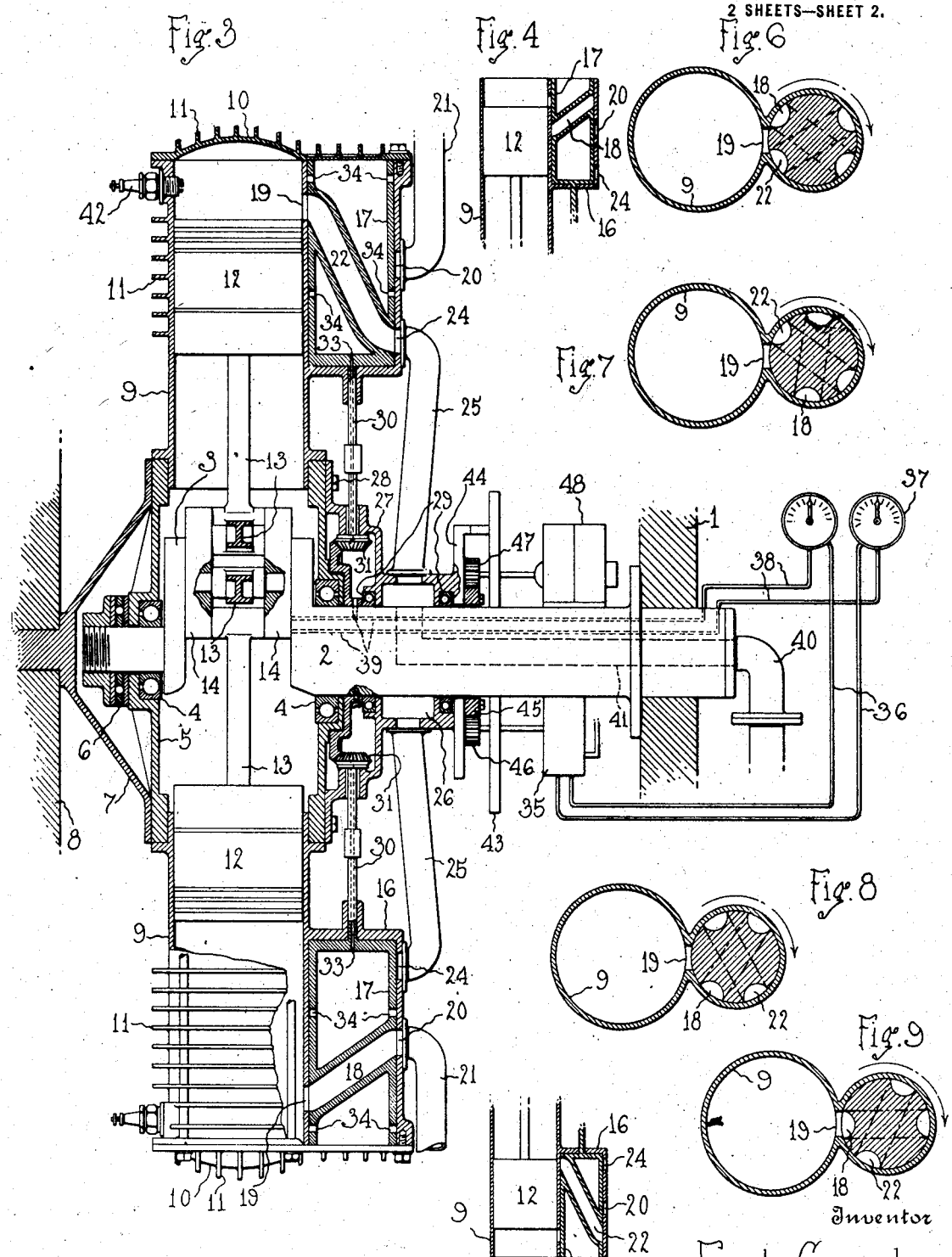

UNITED STATES PATENT OFFICE.

FRANK GIRARDI, OF DETROIT, MICHIGAN, ASSIGNOR OF ONE-HALF TO JOSEPH BASIL, OF DETROIT, MICHIGAN.

ROTARY ENGINE.

1,333,615.  Specification of Letters Patent.  Patented Mar. 16, 1920.

Application filed January 31, 1919. Serial No. 274,221.

*To all whom it may concern:*

Be it known that I, FRANK GIRARDI, a citizen of the United States of America, residing at Detroit, in the county of Wayne and State of Michigan, have invented certain new and useful Improvements in Rotary Engines, of which the following is a specification, reference being had therein to the accompanying drawings.

This invention relates to a rotary cylinder internal combustion engine, and has special reference to a light and durable engine that has been especially designed as a power plant of an air plane, hydroplane or speed vehicle that may be propelled by a propeller.

My invention is characterized by a plurality of radially disposed cylinders adapted to revolve about a stationary crank shaft, which also constitutes a bearing for the revoluble crank case and cylinders of the engine. The crank case is adapted to be connected direct to a propeller, so that the propeller and crank case will be driven in synchronism.

My invention is further characterized by novel rotary valves controlling the admission and exhaust of fuel and gases to and from the cylinders of the engine, the rotary valves being disposed in parallelism with the radial axes of the cylinders, and set out of the vertical plane of said cylinders so as to coöperate therewith in serving as a propeller.

The invention is further characterized by a novel oil distributing system, and ignition system, and other features, all of which coöperate to provide an engine that is highly efficient as the power plant of an air plane.

My invention will be hereinafter considered in detail and then claimed, and reference will now be had to the drawings, wherein—

Fig. 3 is a side elevation of the engine, partly broken away and partly in section;

Fig. 4 is a detail sectional view, on a small scale, of a rotary valve showing an exhaust passage;

Fig. 5 is a similar view of the same, showing an intake passage, and

Figure 1:
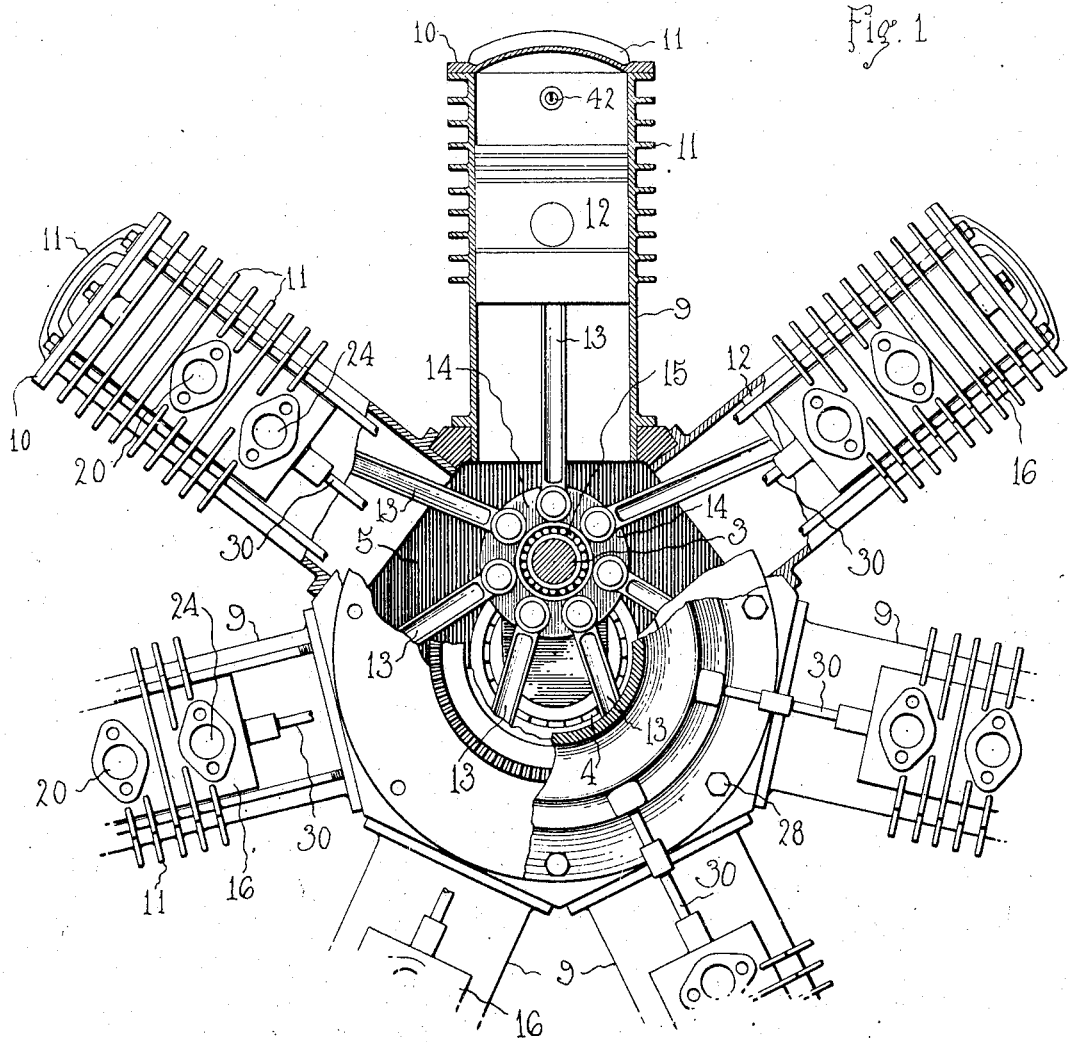
Figure 1 is an end view of a portion of the engine partly broken away and partly in section.

Figs. 6 to 9 inclusive are diagrammatic views of a rotary valve, showing different positions of the same.

In describing my invention by aid of the views above referred to, I desire to point out that the same are merely illustrative of an example by which my invention may be put into practice and I do not care to confine my invention to the precise construction and arrangement of parts shown. The following description is therefore to be broadly construed as including such substitute constructions and arrangement of parts which are the obvious equivalents of those to be hereinafter referred to.

In the drawings, the reference numeral 1 denotes a suitable support or bearing for a stationary shaft 2 having a crank portion 3 and at the sides of said crank portion are anti-frictional bearings 4 supporting a crank case 5. The crank case 5 is held against longitudinal movement by an end thrust bearing 6 on the end of the stationary shaft 2 and said crank case is connected by a coupling member 7 to a propeller 8, said coupling member constituting a housing for the end thrust bearing 6 and the end of the crank shaft 2.

Mounted on the crank case 5 and communicating therewith are a plurality of radially disposed cylinders 9 having heads 10, said cylinders and said heads being provided with heat disseminating webs or ribs 11, as best shown in Fig. 1.

Slidable in the cylinders 9 are pistons 12 provided with suitable packing rings, and said pistons have connecting rods 13 pivotally mounted between the heads 14 surrounding the crank portion 3 of the stationary crank shaft 2.

Figure 2:
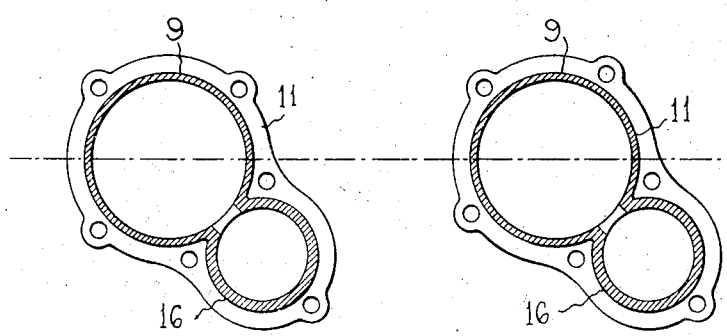
Fig. 2 shows cross sectional views of engine cylinders and valve bodies, showing the relation to each other.

Each of the cylinders 9 has a parallel valve body 16 integral therewith and these valve bodies are set to one side of a vertical plane of all of the cylinders 9, as best shown in Fig. 2 so that said cylinders and their valve bodies will conform somewhat to the blades of the propeller and during their rotation about the axis of the stationary crank shaft coöperate with the propeller 8, which revolves in synchronism with the end of the cylinder, in propelling an air plane equipped with the engine. In the valve bodies 16 are hollow rotary valves 17 provided with angularly disposed exhaust passages or conduits 18 adapted to establish communication between the ports 19 of the cylinders 9 and exhaust ports 20 of the valve bodies 16, said exhaust ports 20 being in communication with suitable exhaust pipes 21. The hollow valves 17 are also provided with angularly disposed intake passages or conduits 22 adapted to establish communication between the ports 19 of the cylinders 9 and the intake ports 24 of the valve bodies 16, said intake ports 24 being in communication with converging pipes 25 suitably connected to an annular manifold 26 surrounding the stationary crank shaft 2. The manifold 26 is part of a gear casing 27 suitably connected, as at 28, to the crank case 5, and antifrictional bearings 29 insure each rotation of the manifold and gear casing on the crank shaft 2.

The rotary hollow valve 17 is provided with tubular stems 30 extending into the gear casing 27, said tubular stems having beveled gear wheels 31 meshing with a stationary rack suitably fixed to the crank shaft 2, so that when the gear casing 27 is revolved, a rotary movement will be imparted to the hollow valves 17. These valves during rotation are adapted to admit fuel and exhaust gases to and from the cylinders 9 in timed relation and the various positions of the hollow valves have been diametrically illustrated in Figs. 6 to 9 inclusive.

The tubular valve rods or stems 30 are adapted to conduct a suitable lubricant from the gear casing 27 into the hollow valves 17, said valves being ported, as at 33 and 34, so that oil may be distributed in the valve bodies 16 to insure an easy rotation of the rotary valves therein. Oil is supplied to the gear casing 27 from a suitable pump 35 carried by the crank shaft 2, said pump having connections 36 with gages 37 and said gages have suitable connections 38 to ports 39 in the stationary crank shaft 2. Some of the ports 39 communicate with the gear casing 27 and others may communicate with the crank case 5, so that all of the movable parts of the engine will be thoroughly lubricated.

Communicating with the end of the crank shaft 2 is a fuel supply pipe 40, said stationary crank shaft having a port 41 establishing communication between the manifold 29 and said pipe. A carbureter or any other device may be connected to the pipe 40 to supply a suitable fuel or explosive mixture to the outer ends of the cylinders 9, where spark plugs 42 are located for ignition purposes.

Fixed on the stationary crank shaft 2 is a distributer 43 and contacting therewith is a brush 44 having a rack 45, said brush and rack being connected to the manifold 26 to move therewith. Meshing with the rack 45 are pinions 46 and 47, the former operating the pump 35 and the latter operating a magneto 48 mounted on the stationary crank shaft 2. Suitable electrical connections are established with the spark plugs 42 so that explosive mixture in the outer ends of the cylinders 9 may be ignited in timed relation by the distribution of an electric current at the distributer 43.

In operation, the explosion of fuel within the outer ends of the cylinders 9 causes the cylinders to revolve about the longitudinal axis of the crank shaft 2 and consequently a rotary movement is imparted to the propeller 8 or any other element of construction attached to the crank case rotatable about the crank shaft. During this rotary movement of the plurality of cylinders 9, the ignition system is in operation and the manner of distributing lubricant to the various valve bodies insures thorough lubrication of the hollow rotary valves 17.

What I claim is:—

1. In a multi-cylinder internal combustion engine, a stationary crank shaft having lubricant ports, a crank case rotatable about said shaft, radially disposed cylinders carried by said crank case and in communication therewith, pistons reciprocable in said cylinders and articulated with said stationary crank shaft, valve bodies carried by said cylinders, said valve bodies having exhaust and intake ports, a manifold rotatable with said crank case and communicating with the intake ports of said valve bodies, rotary valves in said valve bodies adapted for controlling the intake and exhaust of fuel and gases to and from the cylinders of said engine, a gear casing carried by said crank case communicating with the lubricant ports of said stationary crank shaft, tubular valve stems carried by said valves and extending into said gear casing and adapted to conduct lubricant from said crank shaft into said valve bodies, and gears in said gear casing causing said valve stems and the valves thereof to revolve when said cylinders move about said crank shaft.

2. In combination with a rotary engine having cylinders disposed to rotate about a stationary shaft;—a valve mechanism for said engine, comprising valve bodies communicating with said cylinders, rotary hollow valves in said bodies and provided with intake and exhaust passages adapted to communicate with the engine cylinders, said hollow valves having lubricant ports opening at the walls of said valve bodies, a casing about said shaft adapted to receive lubricant therefrom, tubular valve stems carried by said valves and extending into said casing and adapted to conduct lubricant from said casing into said valve bodies, and means in said casing causing said valve stems and the valves thereof to revolve when said cylinders move about said shaft.

In testimony whereof I affix my signature in the presence of two witnesses.

FRANK GIRARDI.

Witnesses:
KARL H. BUTLER,
ANNA M. DORR.